United States Patent [19]

Woodward et al.

[11] Patent Number: 4,958,097

[45] Date of Patent: Sep. 18, 1990

[54] STARTER WITH FLEXING SOLENOID LEVER

[75] Inventors: Malcolm C. Woodward, Warley; Barry Twilton, Solihull, both of England

[73] Assignee: Magneti Marelli Electrical Limited, Great Britain

[21] Appl. No.: 372,069

[22] Filed: Jun. 27, 1989

[30] Foreign Application Priority Data

Jun. 28, 1988 [GB] United Kingdom ............... 88153663

[51] Int. Cl.[5] ........................ H02K 7/20; F02N 11/00; F02N 15/06

[52] U.S. Cl. ........................................ 310/83; 74/7 A; 290/38 R

[58] Field of Search .......................... 74/7 A, 7 C, 850; 290/38 R, 48; 310/83, 80; 123/179 R, 179 M

[56] References Cited

U.S. PATENT DOCUMENTS

| | | | |
|---|---|---|---|
| 3,283,595 | 11/1966 | Inagaki . | |
| 3,955,427 | 5/1976 | Squires | 74/7 A |
| 3,971,353 | 7/1976 | Harkness et al. | 74/850 |
| 4,116,077 | 9/1978 | Mazzorana | 74/7 A |
| 4,296,342 | 10/1981 | Young et al. | 74/7 A |
| 4,488,054 | 12/1984 | Ebihara | 74/7 A |

FOREIGN PATENT DOCUMENTS

| | | |
|---|---|---|
| 1424804 | 2/1965 | France . |
| 2544023 | 4/1983 | France . |
| WO79/00061 | 7/1977 | PCT Int'l Appl. . |
| 2021202B | 4/1982 | United Kingdom . |

*Primary Examiner*—William H. Beha, Jr.
*Assistant Examiner*—D. L. Rebsch
*Attorney, Agent, or Firm*—Andrus, Sceales, Starke & Sawall

[57] ABSTRACT

A starter motor, for use with an internal combustion engine, comprising an electric motor, a shaft rotated by the motor and carrying a pinion assembly, a solenoid spaced from said shaft and including an armature movable from a rest position towards an operative position by energization of an electromagnet winding of the solenoid, and, a lever assembly mounted for pivotal movement about an axis passing between the solenoid and said shaft. The lever assembly links the armature of said solenoid and said pinion assembly such that movement of the armature is transmitted to the pinion assembly to move the pinion assembly axially on said shaft from a rest position towards an operative position, and comprises a rigid element supported for pivotal movement about said axis and a resilient element carried by said rigid element and coupled at one end to said armature. The end of the lever assembly remote from said solenoid is coupled to said pinion assembly, and said resilient element includes a region shaped to flex torsionally in the event of operative movement of said solenoid armature without corresponding movement of the pinion assembly, said region being prestressed during construction of the lever assembly in such a direction that the torsional stressing of said region would be increased by said movement of the solenoid armature relative to the pinion assembly.

7 Claims, 4 Drawing Sheets

STARTER WITH FLEXING SOLENOID LEVER

Figure 1:
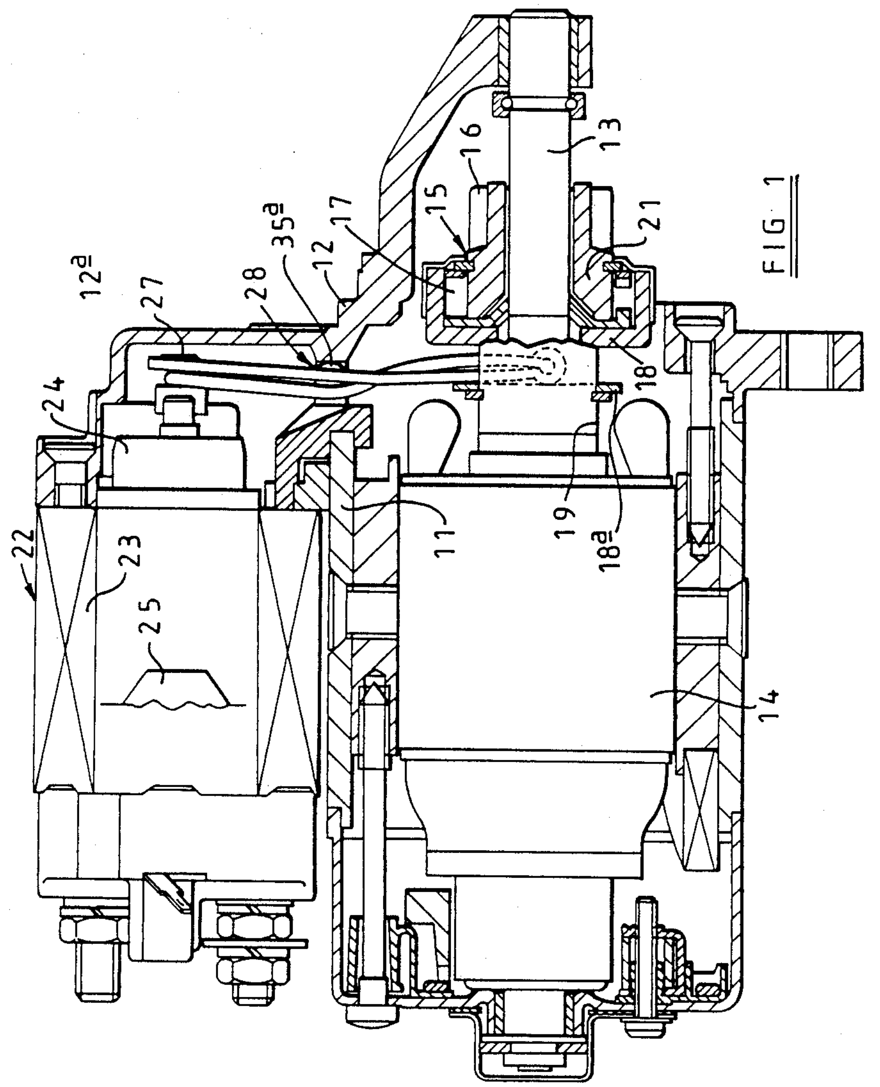

This invention relates to a starter motor for an internal combustion engine, and to a composite lever assembly for use in such a starter motor.

A well known form of starter motor includes a shaft rotated by the electric motor of the starter motor and supporting a pinion assembly having a pinion gear wheel engagable, in use, with a ring gear of the associated internal combustion engine. The pinion assembly is movable axially on the shaft between a rest position in which the pinion gear wheel is axially spaced from the engine ring gear, and an operative position in which the pinion gear wheel meshes with the engine ring gear to transmit rotation of the shaft to the engine ring gear to crank the engine. Disposed adjacent the pinion assembly, with its axis parallel to but spaced from the axis of the pinion assembly, is a solenoid including an electromagnet winding, and an axially movable armature, movable from a rest position to an operative position against the action of a return spring by energization of the electromagnet winding. Associated with the solenoid are normally open electrical contacts which are closed by movement of the armature of the solenoid to its, operative position, closure of the contacts energizing the electric motor of the starter motor.

The solenoid armature is coupled to the pinion assembly so that movement of the armature from its rest position towards its operative position moves the pinion assembly from its rest position towards its operative position. Numerous alternative lever assemblies have previously been proposed for providing the operative connection between the solenoid armature and the pinion assembly. For example French Pat. specification No. 1424804 shows, in FIG. 5, an arrangement where the solenoid armature is coupled to the pinion assembly by means of a composite lever, that is to say a lever incorporating more than one element. The lever of FIG. 5 of French specification No. 1424804 has its individual elements secured together by means of a rivet at their mid point. This is inherently disadvantageous since the operation of producing a hole, and introducing a rivet, inevitably weakens the lever construction and produces a region at which the lever may fracture in use. Nevertheless, the concept shown in FIG. 5 of French specification No. 1424804 is interesting since it would be possible, by judicious construction of the individual elements of the lever, to permit a pre-loading to be built into the lever during its construction. Unfortunately the degree of pre-loading which can be built into a lever of the kind shown in FIG. 5 of French specification No. 1424804 is quite small, and thus there is a risk that during use of the lever the flexing element thereof may be flexed beyond its yield point, and thus may take an undesirable set. It is an object of the present invention to provide a starter motor, and lever assembly for use in a starter motor, whereby disadvantages of prior proposals, including that disclosed in French specification No. 1424804, are minimized in a simple and convenient form.

In accordance with the present invention there is provided a starter motor, for use with an internal combustion engine, comprising an electric motor, a shaft rotated by the motor and carrying a pinion assembly, a solenoid spaced from said shaft and including an armature movable from a rest position towards an operative position by energization of an electromagnet winding of the solenoid, and, a lever assembly mounted for pivotal movement about an axis passing between the solenoid and said shaft, said lever assembly linking the armature of said solenoid and said pinion assembly such that movement of the armature is transmitted to the pinion assembly to move the pinion assembly axially on said shaft from a rest position towards an operative position, said lever assembly comprising a rigid element supported for pivotal movement about said axis and a resilient element carried by said rigid element and coupled at one end to said armature, the end of the lever assembly remote from said solenoid being coupled to said pinion assembly, and, said resilient element including a region shaped to flex torsionally in the event of operative movement of said solenoid armature without corresponding movement of the pinion assembly, said region being prestressed during construction of the lever assembly in such a direction that the torsional stressing of said region would be increased by said movement of the solenoid armature relative to the pinion assembly.

Preferably said resilient element is fixed to said rigid element adjacent the pinion assembly end of the lever assembly and extends, intermediate its ends, through an aperture in the rigid element, said region of the resilient element lying to one side of the rigid element while said one end of the resilient element lies to the other side of the rigid element, said aperture being dimensioned to accommodate movement of part of the resilient element relative to the rigid element during torsional flexure of said region.

Figure 2:
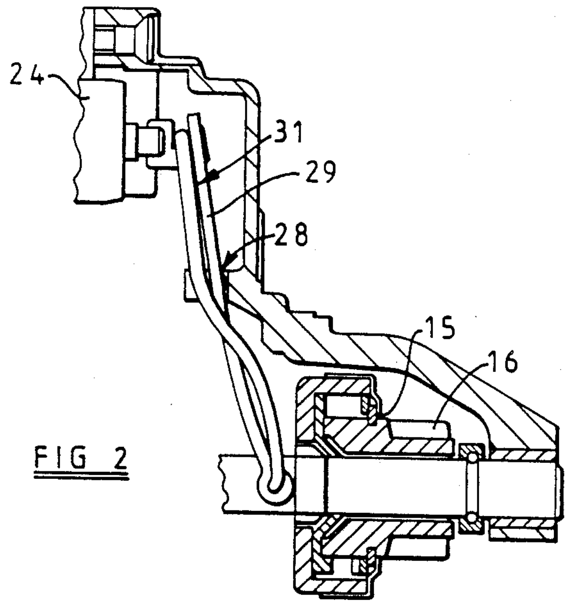
Figure 3:
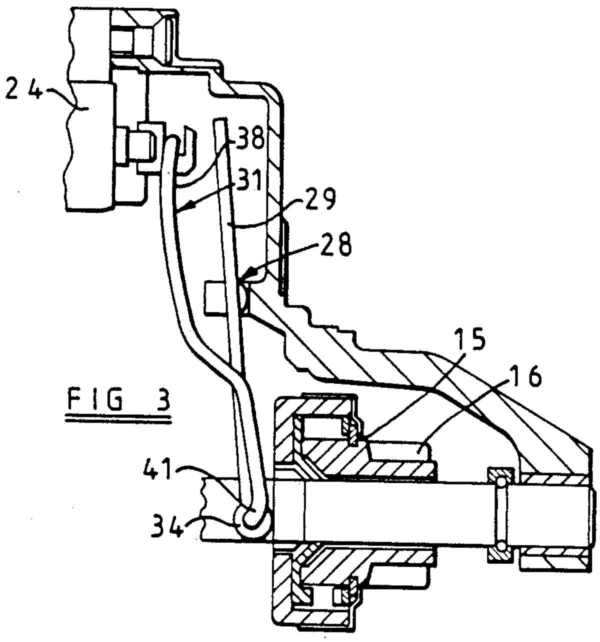
Figure 4:
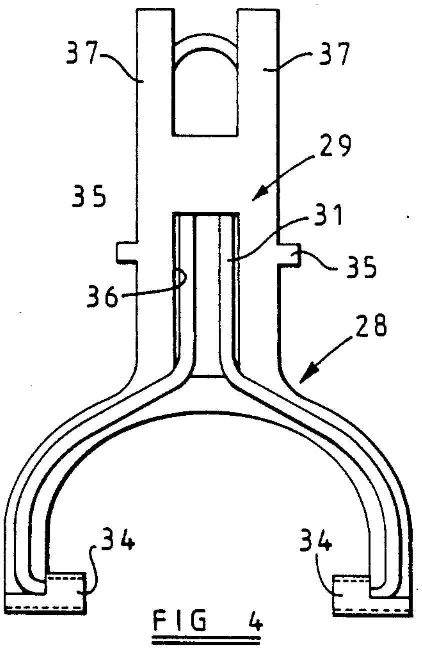
Figure 5:
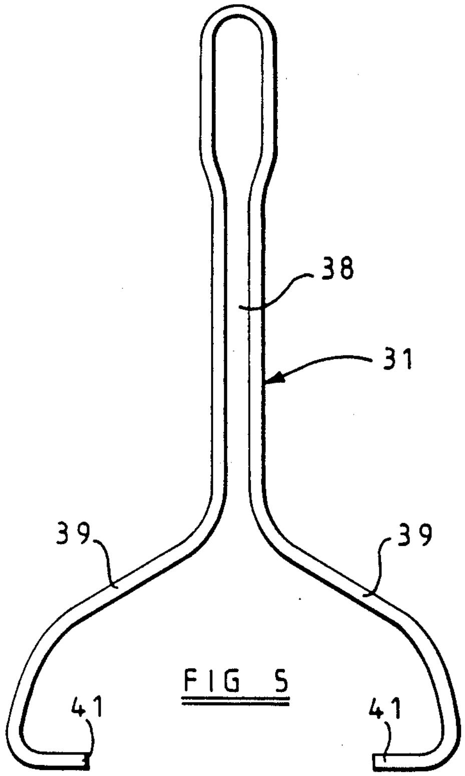
Figure 6:
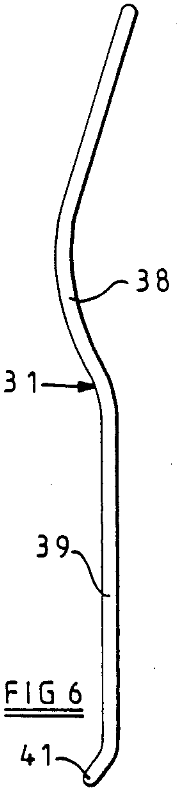
Figure 7:
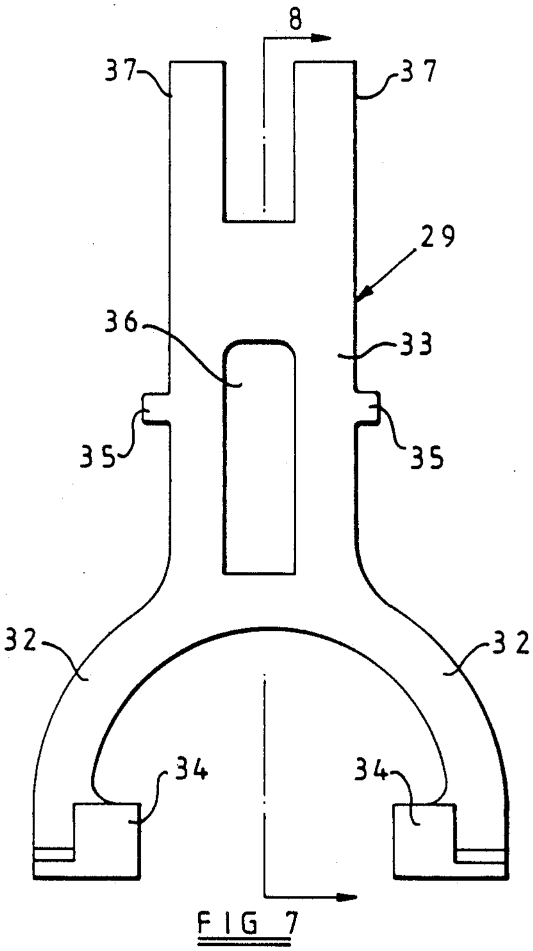
Figure 8:
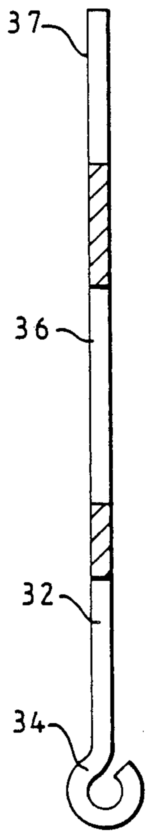

One example of the invention is illustrated in the accompanying drawings wherein:

FIG. 1 is a diagrammatic view, partly in section, of part of a starter motor for use with an internal combustion engine, FIG. 1 showing the parts in their rest position, FIG. 2 is a view similar to FIG. 1 but showing the parts in their operative position, FIG. 3 is a view similar to FIG. 1 but illustrating the position assumed by the parts in a tooth-to-tooth condition, FIG. 4 is a front elevational view of a composite lever assembly of the starter motor illustrated in FIGS. 1 to 3, FIG. 5 is a front elevational view, to an enlarged scale, of a resilient element of the assembly illustrated in FIG. 4, FIG. 6 is a side elevational view of the element illustrated in FIG. 5, FIG. 7 is a front elevational view of a rigid element of the lever assembly illustrated in FIG. 4, and FIG. 8 is a sectional view on the line 8—8 in FIG. 7.

Referring to the drawings, the starter motor includes an elongate, cylindrical, mild steel housing 11 having a die-cast end bracket 12 secured to one axial end thereof. Journalled at one end in a bearing in the end bracket 12, and at its opposite end in a bearing carried by the opposite end cap of the housing 11, is a rotor shaft 13 rotatable by an electric motor 14 within the housing 11. In practice the housing 11 constitutes the yoke of the motor 14 and carries the field system of the motor. The rotor of the motor 14 is carried by the shaft 13 which rotates in its bearings when the motor 14 is energized.

In use the starter motor is positioned adjacent the flywheel of an associated internal combustion engine, the axis of the shaft 13 being parallel to, but spaced from the axis of rotation of the flywheel. At its outer periphery the flywheel carries a ring-gear and the shaft 13 extends adjacent the ring gear, there being an aperture in the end region of the end bracket 12 whereby a pinion gear wheel 16 of a pinion assembly 15 carried by the shaft 13 can mesh with the ring gear of the engine flywheel.

The pinion assembly 15 is of conventional form, being movable axially on the shaft 13 between a rest position (FIG. 1) and an operative position (Figure 2). The pinion assembly includes a roller clutch 17, the outer body 18 of which has a splined connection 19 with the shaft 13. The inner, driven, member 21 of the roller clutch 17 is integral with the pinion 16. Thus rotation of the shaft 13 in one direction is transmitted through the roller clutch 17 to the pinion 16, and when the pinion assembly 15 is in its operative position and the pinion 16 is in meshing engagement with the engine ring gear then rotation of the shaft 13 rotates the engine flywheel, and thus cranks the engine. Should the engine fire and commence to run such that the flywheel speed exceeds the speed of rotation of the shaft 13 then the roller clutch 17 slips so that the pinion 16 can continue to rotate with the flywheel without driving the shaft 13. The splines of the connection 19 between the body 18 and the shaft 13 may be axially extending splines, but more usually the spines will extend in a helical path about the axis of the shaft 13 so that axial movement of the pinion assembly 15 relative to the shaft 13 is accompanied by rotational movement of the pinion assembly about the shaft 13. The helical spline connection will be such that the freedom of rotational movement of the pinion assembly 15 on the shaft 13 is limited, and thus when the pinion assembly reaches its operative position relative to the shaft 13 no further rotational movement of the body 18 relative to the shaft 13 will be possible and drive from the motor 14 will be transmitted to the pinion 16.

Disposed alongside the housing 11, and secured to a lateral extension 12*a* of the end bracket 12, is a solenoid 22. The solenoid 22 has its longitudinal axis parallel to the axis of the shaft 13, and it includes an electromagnet winding 23 wound on a hollow cylindrical former within which a cylindrical mild steel armature 24 is axially slidable. Associated with the electromagnet winding 23 is an electromagnet pole 25 towards which the armature 24 is attracted upon engerization of the winding 23. An armature return spring (not shown) urges the armature 24 to a rest position spaced from the pole 25 and the solenoid has associated therewith an electrical switch (not shown) the normally open contacts of which are closed by the armature 24 moving, as a result of energization of the winding 23, to an operative position. The contacts of the electrical switch are associated with the motor 14 such that closure of the contacts causes energization of the motor 14 and consequential rotation of the shaft 13. As the armature 24 returns to its rest position upon de-energization of the winding 23, then the contacts of the electrical switch open, thus de-energizing the motor 14.

At its end remote from the pole 25 the armature 24 has secured thereto a metal plate 26, including an axially extending portion 27.

Extending through an aperture in an axially extending wall of the end bracket 12 is a composite lever assembly 28, the assembly 28 being coupled at one end through the axially extending plate portion 27 to the armature 24, and being coupled at its opposite end to the pinion assembly 15. At the point where the lever assembly 28 passes through the aperture of the end bracket 12 the lever assembly is pivotally coupled to the end bracket 12 for movement about a pivotal axis extending perpendicular to, and between, the parallel axes of the solenoid 22 and the shaft 13.

The composite lever assembly 28 includes a rigid element 29 and a resilient element 31. The rigid element 29 is conveniently stamped from a strip of spring steel, of thickness such that during use in transmitting movement of the armature 24 to the pinion assembly 15, the element 29 is substantially rigid. As is apparent from FIG. 7 the element 29 is generally in the form of an inverted Y, having a pair of curved limbs 32 extending from one end of a leg region 33. The curved limbs 32 subtend a semi-circle and at their free ends each of the limbs 32 includes a rolled inwardly projecting lug 34. The lugs 34 are, in use, received in a circumferential groove defined in the pinion assembly 15 between the back face of the roller clutch body 18 and a washer 18*a* carried by the assembly 15, and in turn receive end regions of the resilient element 31. The overall length of the element 29 is less than the spacing between the axes of the shaft 13 and the solenoid 22 and thus when the lugs 34 are engaged with the pinion assembly 15, the free end of the leg region 33 terminates short of the axially extending plate portion 27.

Approximately mid-way along the length of the leg region 33 there are provided oppositely directed, integral tags 35 which in use engage in molded nylon bosses 35*a* rotatably received in respective passages in the end bracket 12 whereby the element 29, and thus the assembly 28, are pivotally supported in the end bracket 12. The leg region 33 is formed with an elongate closed-ended slot 36, and at its free end the region 33 has an open ended slot aligned with the slot 36 and bifurcating the end portion of the region 33 to define parallel integral fingers 37. During the stamping operation producing the element 29 from flat strip, the strip is oriented so that the grain (crystalline structure) of material extends lengthwise of the element 29.

The resilient element 31 of the lever assembly 28 is formed by bending a length of spring steel wire as illustrated in FIGS. 5 and 6. Wire of circular cross-section is preferred, but not essential. It can be seen that the element 31 has a form generally similar to that of the element 29, but the overall length of the element 31 exceeds that of element 29. Moreover, while the element 29 is generally planar, the element 31 is curved as will be described in more detail hereinafter. The element 31 includes a leg region 38 and a pair of curved limbs 39 at one end of the region 38. Each of the curved limbs 39 terminates in an inwardly directed portion 41, the portions 41 being aligned with one another. The portions 41 are in fact the two ends of the length of wire from which the element 31 is formed As is apparent from FIG. 6 the limbs 39 and part of the region 38 lie in a common plane, and the end portions 41 are bent to lie to one side of that plane. Moreover, part way along its length of region 38 is bent to the same side of the plane, and then is curved back again so that the end portion of the region 38 intersects the plane.

In order to construct the composite lever assembly the free end of the region 38 is inserted through the slot 36 and the element 31 is then tilted relative to the element 29 to bring the planar portion of the region 38 and limbs 39 towards facial contact with the element 29. However, before this point is reached the free end portion of the region 38 engages the face of the fingers 37 of the region 33 of the element 29 and flexure of the non-planar curved portion of the region 38 must take place in order to enable the planar portion of the region 38 and the limbs 39 to make facial contact with the opposite face of the element 29. The end regions 41 of the limbs 39 are manipulated to engage within the rolled portions defining the lugs 34 of the element 29. The rest configuration of the element 29 and 31 of the lever assembly 28 is clearly illustrated in FIGS. 1 and 2 and it can be seen that the end portion of the region 38 of the element 31 engages the fingers 37 of the portion 33 of the element 28, the element 31 passing through the element 29 at or close to the mid point of the slot 36.

During normal operation of the starter motor, that is to say when there is no tooth-to-tooth abutment between the pinion 16 and the engine ring gear, the relative positions and configurations of the elements 29 and 31 of the lever assembly 28 do not change. Thus during normal operation the lever assembly 28 can be considered to be a rigid lever. The free end of the region 38 of the element 31 is introduced through an aperture in the axially extending plate portion 27 to interconnect the lever assembly 28 and the armature 24.

The operation of the starter motor will now be considered, using FIG. 1 as the starting point. In FIG. 1 both the armature 24 and the pinion assembly 15 are in their rest positions. Energization of the winding 23 of the solenoid 22 attracts the armature 24 towards the pole 25 thus pivoting the lever assembly 28 in a counter-clockwise direction about a line interconnecting the tags 35 of the element 29 of the lever assembly 28. This movement of the lever assembly 28 is transmitted to the pinion assembly 15 to push the pinion assembly along the shaft 13 from a rest position towards an operative position, and assuming that the teeth of the pinion gear wheel 16 can mesh freely with the teeth of the ring gear of the engine, then the pinion assembly 15 will reach its operative position relative to the shaft 13 and the ring gear at the same time that the armature 24 reaches its operative position relative to the electromagnet pole 25. Thus the pinion gear wheel 16 will mesh with the ring gear before the electric switch associated with the solenoid 22 is closed thereby energizing the motor 14. This is the position of the parts illustrated in FIG. 2.

Operation of the motor 14 rotates the shaft 13 and thus the pinion gear wheel 16 and the engine ring gear, so cranking the engine. Assuming that the engine starts to operate, then the driver of the vehicle will release the starter switch thus de-energizing the electromagnet winding 23 and permitting the armature 24, and thus the pinion assembly 15, to be returned towards their rest position by the armature return spring (not shown). It will be understood that during the operation so far described the lever assembly 28 acts as a rigid lever.

During movement of the pinion assembly 15 towards its operative position it can occur that the teeth of the pinion gear wheel 16 meet the teeth of the engine ring gear in a tooth-to-tooth abutment condition. Such abutment prevents further movement of the pinon assembly 15 towards its operative position, but of course the armature 24 continues to be attracted towards its operative position. In these circumstances the element 31 of the lever assembly 28 flexes as illustrated in FIG. 3. The flexure takes place predominately but not exclusively as torsional flexure of the limbs 39 of the element 31 as permitted by the elongate nature of the slot 36 of the element 29. It will be recalled that the element 31 was pre-stressed during assembly of the element 31 to the element 29, and moreover the pre-stressing was such as to urge the armature 24 towards its rest position. Thus the flexure of the element 31 which takes place as a result of continued movement of the armature 24 in a tooth-to-tooth abutment condition is additional to the pre-stressing introduced during construction of the lever assembly. The flexure of the element 31 applies an axial loading to the pinion assembly urging the pinion assembly towards its operative position. The armature 24 continues to move towards its operative position, increasing the stressing, until the electric switch associated with the solenoid 22 closes thus energizing the motor 14. Immediately the pinion wheel gear 16 starts to rotate relative to the ring gear of the engine the tooth-to-tooth abutment condition will be disturbed, and the pinion assembly can then rapidly be moved, by the action of the element 31 to its operative position fully meshing the teeth of the pinion gear wheel 16 with the ring gear of the engine. It will be understood that it is the additional stressing of the element 31 produced by movement of the armature 24 without corresponding movement of the pinion assembly 15, which is released when the tooth-to-tooth condition is disturbed, so driving the pinion assembly 15 to its operative position It will be recognized that when the lever assembly 28 is acting as a rigid lever, that is to say under normal operating conditions, the mechanical advantage is determined simply by the spacing of the axially extending plate portion 27 from the pivot axis of the lever assembly, in relation to the spacing of the lugs 34 from the pivot axis. However, in a tooth-to-tooth abutment condition an increased mechanical advantage is provided since, by virtue of the slot 36 extending below the pivot axis of the lever assembly 28, the effective length of the upper limb of the lever assembly is increased. The result of this is that in a tooth-to-tooth abutment condition the force required to be delivered by the solenoid, to give a predetermined axial loading at the pinion assembly 15, is reduced by comparison with that which would be required if the lever assembly were a rigid lever. It will be recognized that a significant axial loading is called for to ensure that the pinion gear wheel 16 does not "mill" against the ring gear rather than moving rapidly into mesh with the ring gear when the tooth-to-tooth abutment condition is removed.

The composite lever 28 is of a compact nature, and thus does not necessitate an increase in the axial length of the starter motor by comparison with a conventional rigid lever. It will be recognized that the pre-stressing of the element 31 in relation to the element 29 permits a lower rate spring to be employed in the construction of the element 31 thereby affording greater control over the axial loading applied to the pinion, optimization of solenoid coil size, and avoiding an increase in overall starter motor length, as compared with a lever design without pre-stressing. It will be recognized that in a lever design without pre-stressing then a much higher rate spring element would be needed in order to ensure that no deflection of the spring element occurs during normal operation of the starter motor.

As mentioned above, the lever assembly acts as a rigid lever in the event that there is no tooth-to-tooth abutment. Thus when the lever assembly used in a starter motor for a high power diesel engine, where pinion "pumping" can be a problem, the axial reciprocation of the pinion is limited in one direction by the end stop on the pinion shaft and in the other direction by the lever assembly. The reciprocation does not include "float" arising from flexure in the lever assembly as could arise if the element 31 was not prestressed.

We claim:

1. A starter motor, for use with an internal combustion engine, comprising an electric motor, a shaft rotated by the motor and carrying a pinion assembly, a solenoid spaced from said shaft and including an armature movable from a rest position towards an operative position by energization of an electromagnet winding of the solenoid, and a lever assembly mounted for pivotal movement about an axis passing between the solenoid and said shaft, said lever assembly linking the armature of said solenoid and said pinion assembly such that movement of the armature is transmitted to the pinion assembly to move the pinion assembly axially on said shaft from a rest position towards an operative position, said lever assembly comprising a rigid element supported for pivotal movement about said axis and a resilient element carried by said rigid element and coupled at one end to said armature, the end of the lever assembly remote from said solenoid being coupled to said pinion assembly, and said resilient element including a region shaped to flex torsionally in the event of operative movement of said solenoid armature without corresponding movement of the pinion assembly, said region being prestressed during construction of the lever assembly in such a direction that the torsional stressing of said region would be increased by said movement of the solenoid armature relative to the pinion assembly.

2. A starter motor as claimed in claim 1 wherein said resilient element is fixed to said rigid element adjacent the pinion assembly end of the lever assembly and extends, intermediate its ends, through an aperture in the rigid element, said region of the resilient element lying to one side of the rigid element while said one end of the resilient element lies to the other side of the rigid element, said aperture being dimensioned to accommodate movement of part of the resilient element relative to the rigid element during torsional flexure of said region.

3. A starter motor as claimed in claim 1 or 2, wherein said resilient element is formed from spring wire of circular cross-section.

4. A lever assembly for use in a starter motor to operatively link an armature of a solenoid of the starter motor to a pinion of the starter motor, and comprising a rigid element supported in use for pivotal movement and a resilient element carried by said rigid element to be coupled at one end to said armature, the end of the lever assembly remote from said solenoid in use being coupled to said pinion assembly, and said resilient element including a region shaped to flex torsionally in the event of operative movement of said solenoid armature without corresponding movement of the pinion assembly, said region being prestressed during construction of the lever assembly in such a direction that the torsional stressing of said region would be increased by said movement of the solenoid armature relative to the pinion assembly.

5. A lever assembly as claimed in claim 4 wherein said resilient element is fixed to said rigid element adjacent the pinion assembly end of the lever assembly and extends, intermediate its ends, through an aperture in the rigid element, said region of the resilient element lying to one side of the rigid element while said one end of the resilient element lies to the other side of the rigid element, said aperture being dimensioned to accommodate movement of part of the resilient element relative to the rigid element during torsional flexure of said region.

6. A lever assembly as claimed in claim 4 or claim 5 wherein said resilient element is formed from spring wire of circular cross-section.

7. A starter motor as claimed in claim 1, 2, 4 or 5:

(a) wherein both said rigid and resilient elements of said lever assembly are generally Y-shaped, with both elements including a pair of limbs straddling said pinion assembly and said axis, (b) said resilient element defining a merging area wherein the limbs of said resilient element merge at one end thereof into an elongate leg portion linked to said armature, and with the other end of said last-named limbs forming terminus portions disposed at said remote end of said lever assembly, (c) said torsionally flexible region of said resilient element being disposed between said merging area and said terminus portions.

* * * * *